Sept. 18, 1934.     W. E. CHAMBERLAIN     1,974,174
CAMERA FOR INDEXING SKIAGRAPHS
Filed May 17, 1932
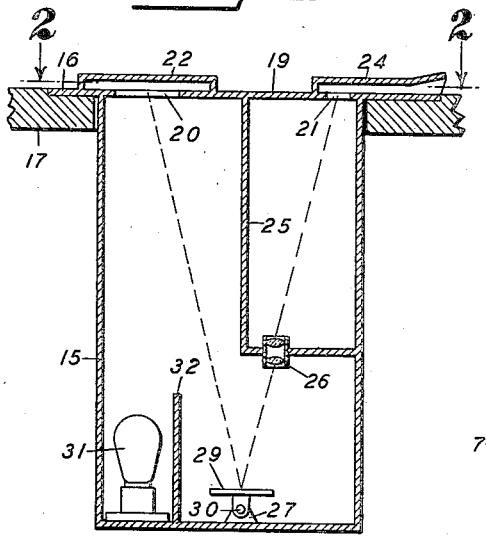
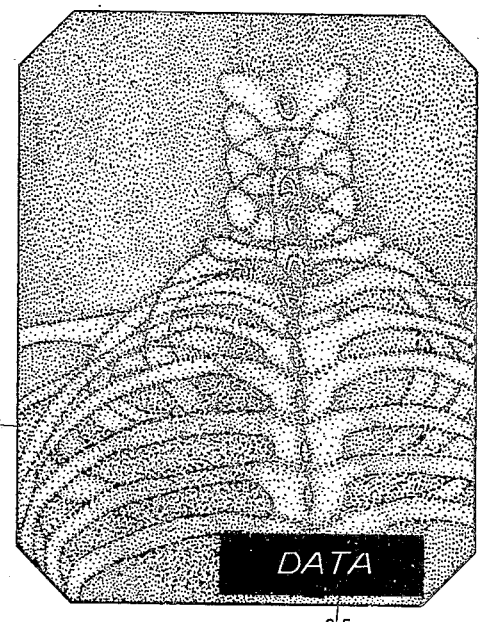
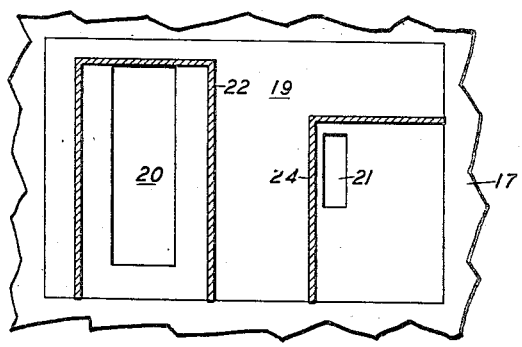
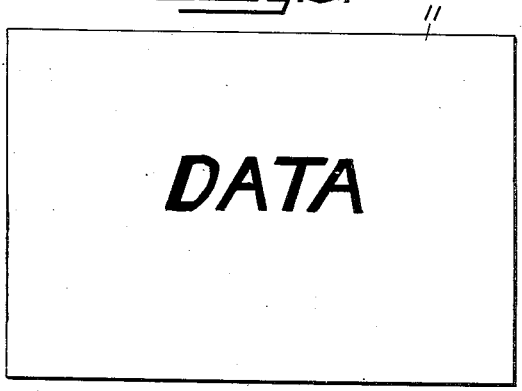
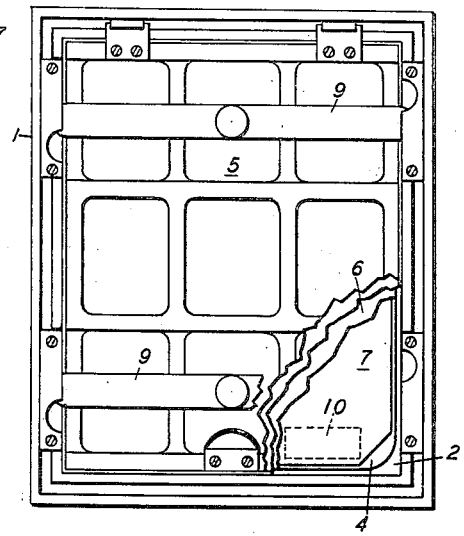
INVENTOR,
WILLIAM EDWARD CHAMBERLAIN.
BY Donald K. Lippincott
ATTORNEY.

Patented Sept. 18, 1934

1,974,174

UNITED STATES PATENT OFFICE 1,974,174

CAMERA FOR INDEXING SKIAGRAPHS

William Edward Chamberlain, Philadelphia, Pa.

Application May 17, 1932, Serial No. 611,822

4 Claims. (Cl. 95—1.1)

My invention relates to the marking of skiagraphs or X-ray plates or films, in order to facilitate their indexing, identification, etc.

Among the objects of my invention are: To provide a means of marking skiagraphs which is simple and does not interfere materially with ordinary technique; to provide a means of marking skiagraphs whereby indexing and exposure data of any character may be imposed directly upon the film or plate; to provide a means of marking which correlates the skiagraph directly with a card-indexing system; to provide a marking camera which imposes the data upon the skiagraph in such manner that it may be read directly from the desired aspect of the negative; to provide a camera of the character described which will position the data upon the film correctly and practically without manipulation of the device; to provide a marking camera whereby the portion of the data selected for imposition upon the film may be changed at will; and to provide a camera which may be manipulated in the dark room without danger of fogging other undeveloped plates or films which may be unprotected in the neighborhood of the device, and which may be operated in the dark without danger of error and without complicating the technique of film handling and development.

Other objects of my invention will be apparent or will be specifically pointed out in the description forming a part of this specification, but I do not limit myself to the embodiment of my invention herein described, as various forms may be adopted within the scope of the claims.

Referring to the drawing:

Figure 1 is a vertical sectional view of the camera of my invention.

Figure 2 is a sectional view of the same camera in plan, the plane of section being indicated by the line 2—2 of Figure 1.

Figure 3 shows one form of indexing card suitable for use with the apparatus of my invention.

Figure 4 shows a skiagraph marked with the data carried by the card of Figure 3.

Figure 5 shows a cassette or film holder having portions cut away in order to disclose the position of the film and intensifying screens ordinarily used therewith, and indicating the method of screening or blanking off the portion of the emulsion upon which the data is to be imposed.

Considered broadly, the method of using my invention comprises shielding or blocking off a portion of the photographic emulsion from the action of the X-ray, preferably by means of a sheet of lead inserted in the cassette or other exposure holder. After the skiagraphic exposure is made, the film is removed from the holder and inserted in a camera, which photographs the desired data optically upon the film, after which both skiagraphic and optical records are developed in the usual manner. The camera of my invention comprises a casing having windows, preferably of similar shape, and of appropriate size to accommodate the data portion of the indexing card and the unexposed portion of the emulsion respectively. Within the casing is a partition separating the two windows, and a lens is mounted in the partition so that the two windows are at conjugate foci thereof. These foci may be directly opposite each other if desired, but preferably both windows are in the same wall of the casing and a reflecting surface is provided which reverses the image of one window and coacts with the lens to project it upon the other window. Guides adjacent the windows position both the data card and the film or plate, and means are provided within the casing for illuminating the data card window and for shielding the film or plate window from the illuminating means.

In all cases where relatively large numbers of X-ray photographs or skiagraphs are handled, one of the most important problems is the proper identification of the films. A common technique requires the preparation of an index card for each of the films. A number is assigned to each skiagraph and is marked upon the card, and this number is photographed upon the film, usually by means of lead letters, similar to pattern-makers' letters, which are placed upon a strip of adhesive tape which is then secured to the film holder in which the exposure is made. The films are then filed by number, and reference to the index card is required in order that the necessary data as to the patient, the conditions under which the skiagraph was made, the operator making it, and other pertinent matter may be secured. The disadvantages of this method are obvious, but the limitations of the method of marking the films are such that the inclusion of any data other than a mere reference number is impractical.

In exposing negatives for use with my invention the ordinary cassette may be used, as shown in Figure 5. This cassette comprises a frame 1 having an aluminum face 2 through which the exposure is made, and to which is secured a fluorescent intensifying screen 4. The frame is provided with a hinged back 5, to which may be secured a second intensifying screen 6. In use, the back is opened, the film 7 is placed in the cassette, and the back is then closed and secured by spring clamps 9. This portion of the technique is the same as that ordinarily used, with the exception that there is fastened to the cassette a small strip of lead sheet or foil 10. This strip may be fastened to the front face 2 of the cassette, either inside or out, or may be fastened to the intensifying screen 4 where it will contact directly with the film. Where a cassette is not used, but the exposure is made within a paper envelope, the lead strip 10 may be fastened to the envelope. In the cassette technique it is preferable that a lead strip be permanently affixed in the same position in each cassette used.

Before making the exposure a data card 11 is prepared in the usual manner. Inscribed upon the obverse side of this card are all of the data which it is desired that the skiagraph shall carry. In the card shown, the name and age of the patient, the filing number of the exposure, the date, and the voltage and current used in making the exposure, together with the initials of the technician or operator are merely symbolized by the word "data". Any other data may, of course, be substituted, and the reverse of the card may carry any additional information which is wanted for reference but need not be shown on the film.

In order to photograph the data card upon the film a special camera is preferably used, as shown in Figure 1. This camera is conveniently mounted in the table or bench upon which the cassettes are handled, and comprises a rectangular light-tight box or casing 15 having an extended flange 16 at the top from which the camera is suspended from the top 17 of the bench.

In the top wall 19 of the casing two windows are formed. These windows are conveniently of the same shape, but may differ in size. The first window 20 is of such size and shape as to include within its aperture the data from the card 11 which it is desired to show upon the film. The window 21 may conveniently be smaller, and should be substantially of the same size as the lead strip 10 in the cassette.

Covering the window 20, i. e., with its walls adjacent thereto, is a guide 22 of proper form to permit the insertion of the card 11 with its data side down. The cover portion of this guide is not, of course, a necessary feature, but is convenient for more accurately placing the data card in place in the dark, and also prevents the accidental escape of light from undesired sources into the camera or the dark room. Adjacent the window 21 is a second guide 24, which preferably comprises two sides and a top only, so as to receive and position the corner of the film. This guide also preferably covers the window, and is so positioned that the portion of the film which has been blanked off, during exposure, by the lead strip 10, will be accurately positioned over the window.

Within the casing 15 is a partition 25, between the windows. This partition carries a suitable lens 26.

Mounted in the bottom of the casing, on a bracket 27 is a mirror 29. The lens and mirror are so positioned that the two windows 20 and 21 are at conjugate foci of the lens. The mirror is preferably mounted on an adjustable or hinged joint 30, so that it may be tilted slightly to include or exclude certain portions of the data card, as shown in the window 20, in the image projected upon the window 21. This adjustable feature is not necessary, however.

Also mounted in the bottom of the casing is means for illuminating the window 20. This preferably comprises an incandescent electric lamp 31. A partition 32 is positioned between the lamp 31 on one side and the mirror 29 and lens 26 on the other, so that direct illumination from the lamp is prevented from falling upon the other two elements.

In utilizing this device, the data card is slipped into the guide 22 with the data side down. The cassette is placed face down upon the dark room bench after the Roentgen-ray exposure is made, in the usual manner. The cassette is opened, and the film is lifted out and inserted in the guide 24, still with its face down, and the optical exposure is made by illuminating the window 20 and the data card displayed therethrough by means of a lamp 31. The film is then removed from the guide and developed in the usual manner, both the Roentgen ray and the optical exposure being developed simultaneously and without any particular reference in technique to the optical exposure.

Figure 4 illustrates the film 7 after development. At the bottom of the film will be noted the photographed data portion 35, displaying the same material as is borne on the card 11. Because of difficulties in reproduction, the portion 35 is shown in positive, but it will be understood that on the actual film the data would be shown in negative. Owing, however, to the fact that the image has been reversed by the mirror 29, this image will be erect as viewed from the "right" side of the film, that is, the side from which said films are customarily inspected.

It will be obvious that this technique could be modified by placing the windows in different walls of the camera and photographing the data upon the film without reversal. This would simply require that the film be reversed after its removal from the cassette and before placing it in the camera for exposure, or else that the data be read from the wrong side of the film. The procedure here described in detail is, however, much to be preferred.

Where glass plates or other vehicles for the photographic emulsion are used the essentials of the procedure are the same as with film, plates, films, and photographic papers being complete equivalents in so far as the instant invention is concerned.

I claim:

1. A camera for indexing skiagraphs comprising a casing having two windows of similar shape formed in a wall thereof, a partition within said casing between said windows, a lens mounted in said partition positioned to project an image of one of said windows upon the other window, means within the casing for illuminating one of said windows, and means for screening the other window from said illuminating means.

2. A camera for indexing skiagraphs comprising a casing having two windows of similar shape formed in a wall thereof, a partition within said casing between said windows, a lens mounted in said partition, a reflecting surface mounted within the casing and positioned with respect to said lens so as to project the image of one of said windows upon the other window, means within the casing for illuminating one of said windows, and means for screening the other window and said reflecting surface from said illuminating means.

3. A camera for indexing skiagraphs comprising a casing having a pair of windows formed in the top thereof, a partition in said casing between said casing, a lens mounted in said partition, a mirror mounted in the bottom of said casing and positioned to coact with said lens to project an image of one of said windows upon the other window, and means within the casing for illuminating one of said windows.

4. A camera for indexing skiagraphs comprising a casing having a pair of windows formed in the top thereof, a partition in said casing between said casing, a lens mounted in said partition, and a mirror adjustably mounted in the bottom of said casing and positioned to coact with said lens to project an image of a selected portion of one of said windows upon the other window.

WILLIAM EDWARD CHAMBERLAIN.